United States Patent
Yelamarty

(10) Patent No.: US 6,317,527 B1
(45) Date of Patent: Nov. 13, 2001

(54) OPTICAL ISOLATOR AND CIRCULATOR

(75) Inventor: Rao V. Yelamarty, Allentown, PA (US)

(73) Assignee: Agere Systems Optoelectronics Guardian Corp., Allentown, PA (US)

(*) Notice: Subject to any disclaimer, the term of this patent is extended or adjusted under 35 U.S.C. 154(b) by 0 days.

(21) Appl. No.: 09/293,426

(22) Filed: Apr. 16, 1999

(51) Int. Cl.[7] ............................................. G02B 6/00
(52) U.S. Cl. ......................... 385/11; 385/24; 385/36; 359/122; 359/129; 359/143
(58) Field of Search ................................ 385/11, 36, 24; 359/129, 122, 143, 124

(56) References Cited

U.S. PATENT DOCUMENTS

| | | | |
|---|---|---|---|
| 5,223,975 | * 6/1993 | Naganuma et al. | 359/487 |
| 5,276,549 | * 1/1994 | Tagawa et al. | 359/341 |
| 5,280,549 | * 1/1994 | Barnard | 385/15 |
| 5,317,655 | * 5/1994 | Pan | 385/11 |
| 5,689,593 | * 11/1997 | Pan et al. | 385/11 |

* cited by examiner

Primary Examiner—Cassandra Spyrou
Assistant Examiner—Leo Boutsikaris
(74) Attorney, Agent, or Firm—Schnader Harrison Segal & Lewis LLP

(57) ABSTRACT

An optical device and method for bidirectional communication in both high and low bit rate applications simultaneously using a polarization-sensitive beam splitting cube and optical port assemblies. The device provides optical isolation for a transmitting laser optic source and provides optical reflection of an optical beam to a receiver, simultaneously, over a single fiber optic link.

28 Claims, 6 Drawing Sheets

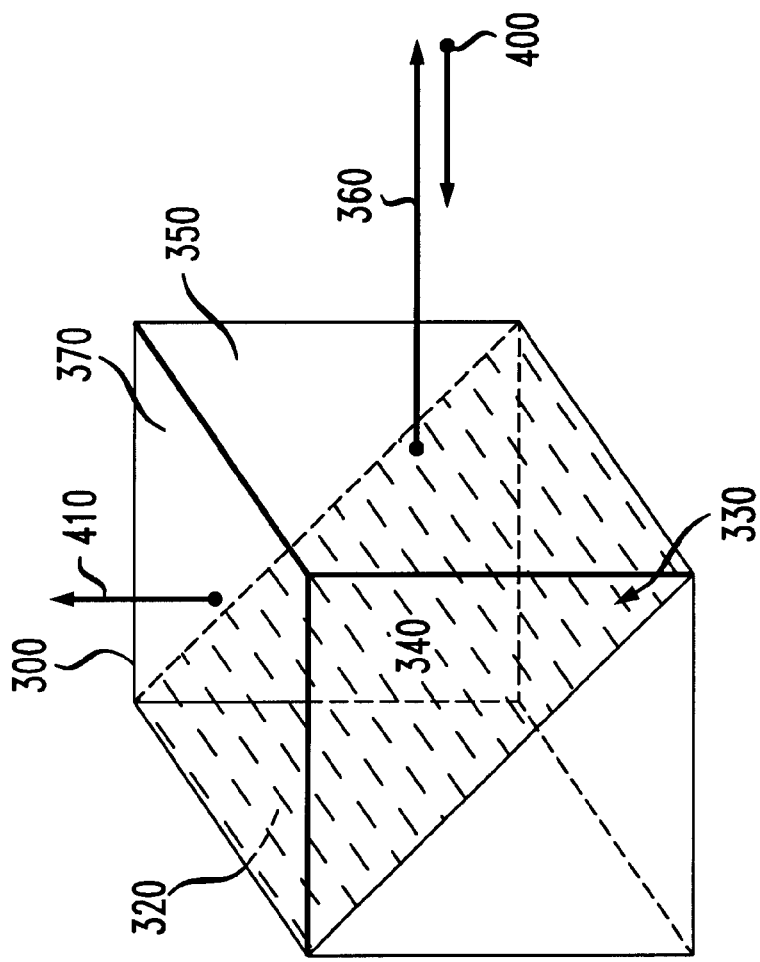
FIG. 2
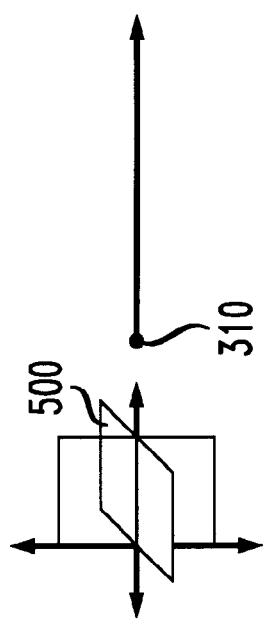

OPTICAL ISOLATOR AND CIRCULATOR

BACKGROUND OF THE INVENTION

1. Field of Invention

The present invention relates generally to bidirectional fiber optic communication systems and, more particularly, to an optical device which may be configured as an optical isolator and circulator for use in both high and low bit rate applications in such fiber optic systems.

2. Description of the Prior Art

Communication service providers are experiencing significant consumer demands to accommodate additional bandwidth in optically-based communications systems and the demand is ever-increasing. Today's optical communication systems and networks field rising consumer demands for e-mail, video, multimedia, data and voice-data transmission requirements across a variety of communication protocols. In the future, all indications are that the use of fiberoptic networks will become even more prevalent as a preferred medium for transferring information as the marketplace for wide-band services matures. It is anticipated that additional services such as enhanced pay-per-view, video-on-demand, interactive television and gaming, image networking, video telephony, CATV and ISDN switching services will be depend on and be substantial users of such systems. Because capacity is a critical parameter for system viability, bidirectional systems are desirable when the increased capacity or other attributes afforded by the bidirectional fiber is required. Enabling bidirectional use of installed and developing fiber in fiberoptic systems will permit communication service provider to gain additional utility from limited system resources.

Lasers are employed in numerous applications, particularly within fiberoptic communications networks, in which the laser emits an information-carrying light signal to an optical fiber which transmits the light signal to a photodetector for further processing. Typically, the optical signal propagates in one direction over a signal optical fiber. In a bidirectional fiber optic configuration, an optical signal propagates in both directions over an optical fiber. However, due to the sensitivities of these systems even a small amount of reflected light will cause instability to the laser source in terms of its power and frequency characteristics.

To reduce some of the problems of reflected light, optical circulators and isolators, non-reciprocal devices, may be installed at each end of a fiber link in a system thereby enabling the bit carrying capacity of an existing unidirectional fiber optic link. The use of Faraday isolators in optic systems is well known as an integral component for removing reciprocal light based on the use of polarizers which are rotated by 45 degrees relative to each other on either side of a magnetic medium, as optical isolators passes a signal in the forward direction from a first optical port to a second optical port. Optical circulators are employed in bidirectional systems for multiplexing the forward and reverse paths of an optical light source, such as a laser. Optical circulators provide a non-reciprocal coupling of light between two fiber paths, based on the Faraday rotation of light, as light is treated differently depending on its entry port into an optical port.

As is generally known, an optical circulator is a non-reciprocal optical device which allows the passage of light from a first port to a second port while a reverse optical signal into the second port is transmitted in totality to a third port; similar transmissions continue for remaining ports thusly creating a circulating operation. Effectively, any two consecutive ports of an optical circulator are an optical isolator as signals are transmitted only one way.

FIG. 1 is illustrative of the operation employing optical circulators to provide simultaneous, bidirectional communication in a single fiber optic link. In FIG. 1, optical circulators 100 and 200, each comprised of ports 10, 20, and 30, are installed at opposite ends of a fiber optic link 150. Communication transmitters 110 and 210 are connected to each port 10, communication receivers 120 and 220 are connected to each port 30, and the fiber optic link 150 is connected between ports 20 at each optical circulator. Light entering port 10 exits the optical circulator at port 20 as directionally indicated 160. Light that enters the optical circulator at port 20 exits at port 30 as directionally indicated 170. Light travels bidirectionally across a single fiber 150 as directionally indicated 180.

Using traditional beam splitting plates in bidirectional systems may result in substantial reductions in light intensity each time a light beam passes through a beam splitting plate (e.g. on the order of 50% loss). Typically these "ping-pong" type of fiber communications occur at low speeds. Additionally, there is an increase in noise to the system due to insertion loss, cross-talk and coupling loss. With the advent of long-haul applications, these reflective problems may cause the communication to fail; similarly, low speed rates are not well-suited for long-haul application. Wavelength dependent beam splitter cubes and dichroic mirrors are known in the field. U.S. Pat. No. 5,210,643 (Fuji et al.) discloses a wave combining apparatus having dichroic mirrors for combining laser beams having the same direction of oscillation by waveform division, respectively, and a polarizing beam splitting prism for combining the first and second resultant beams into a single combined waveform. However, the separation and recombination of optical beams as described in this reference is suited only for low-speed applications.

Therefore, the need exists for an apparatus which improves over the light intensity losses, virtually eliminates ghost images resulting from reflections, and is able to communicate in both high and low bit rate applications at a reasonably low-cost.

SUMMARY OF THE INVENTION

In accordance with one aspect of the present invention, the optical device of the present invention is an optical isolator and circulator comprising a Faraday rotator, a polarizer and a polarizing sensitive beam splitting cube to provide optical isolation for the transmitting laser source and at the same time reflect the optical beam to the receiver.

The Faraday rotator rotates linearly polarized light by forty-five degrees such that the rotation may be clockwise or counterclockwise; the Faraday rotator is a traditional Faraday rotator requiring a magnetic field or preferably, is a latched-Faraday rotator which does not utilize a magnetic field. For the traditional Faraday rotator, the presence of an additional magnet ring having a different direction of magnetic field may be required depending on the configuration employed. In the present invention, a first Faraday rotator rotates linearly polarized light counterclockwise forty-five degrees, while a second Faraday rotator rotates linearly polarized light clockwise forty-five degrees in the same reference frame as to the first source.

The Faraday rotator and polarizer may preferably be integrated into a generic bidirectional module capable of transmitting, receiving or both. In this preferred arrangement, the module requires isolation from both specular reflections from fiber, connectors, and transmitted source signals from other emitters or transmitter devices.

In a further preferred arrangement, the bidirectional module comprises an isolator, a circulator, or both.

The polarizing beam splitting cube preferably is comprised of two triangular prisms connected (i.e. affixed) together by a dielectric film or coating. Undesirable light reflections from the cube's faces are eliminated by orienting the cube about the dielectric film's normal axis so that light is incident with nonzero incidence angle at the cube's faces. Preferably, a broadband coating is applied to the cube faces to virtually eliminate reflected light. In an additional preferred embodiment, an absorbing filter is optically cemented on the back face of the cube to absorb stray light.

It is an object of the present invention to provide an apparatus which enables bidirectional transmission and reception of both high and low bit rate applications, simultaneously.

It is another object of the present invention to provide an apparatus which reduces reflective light signals from laser optic sources.

It is another object of the present invention to provide an apparatus which is economically suited for long-haul communication systems.

As will be more readily appreciated from the detailed description that follows, the present invention offers a number of advantages not previously achieved in the prior art. For example, the present invention offers both transmission and receiving capabilities through a single fiber for both low and high bit rate applications.

These and other objects, features and advantages of the present invention will become apparent from the following detailed description of illustrative embodiments thereof, which is to be read in connection with accompanying drawings.

BRIEF DESCRIPTION OF THE DRAWINGS

The invention, together with its various features and advantages, can be readily understood from the following more detailed description taken in conjunction with the Figures herein.

FIG. 2 is a diagrammatic view of the beam splitting cube which provides optical isolation and reflects optical beams.

DETAILED DESCRIPTION OF THE INVENTION

Figure 1:
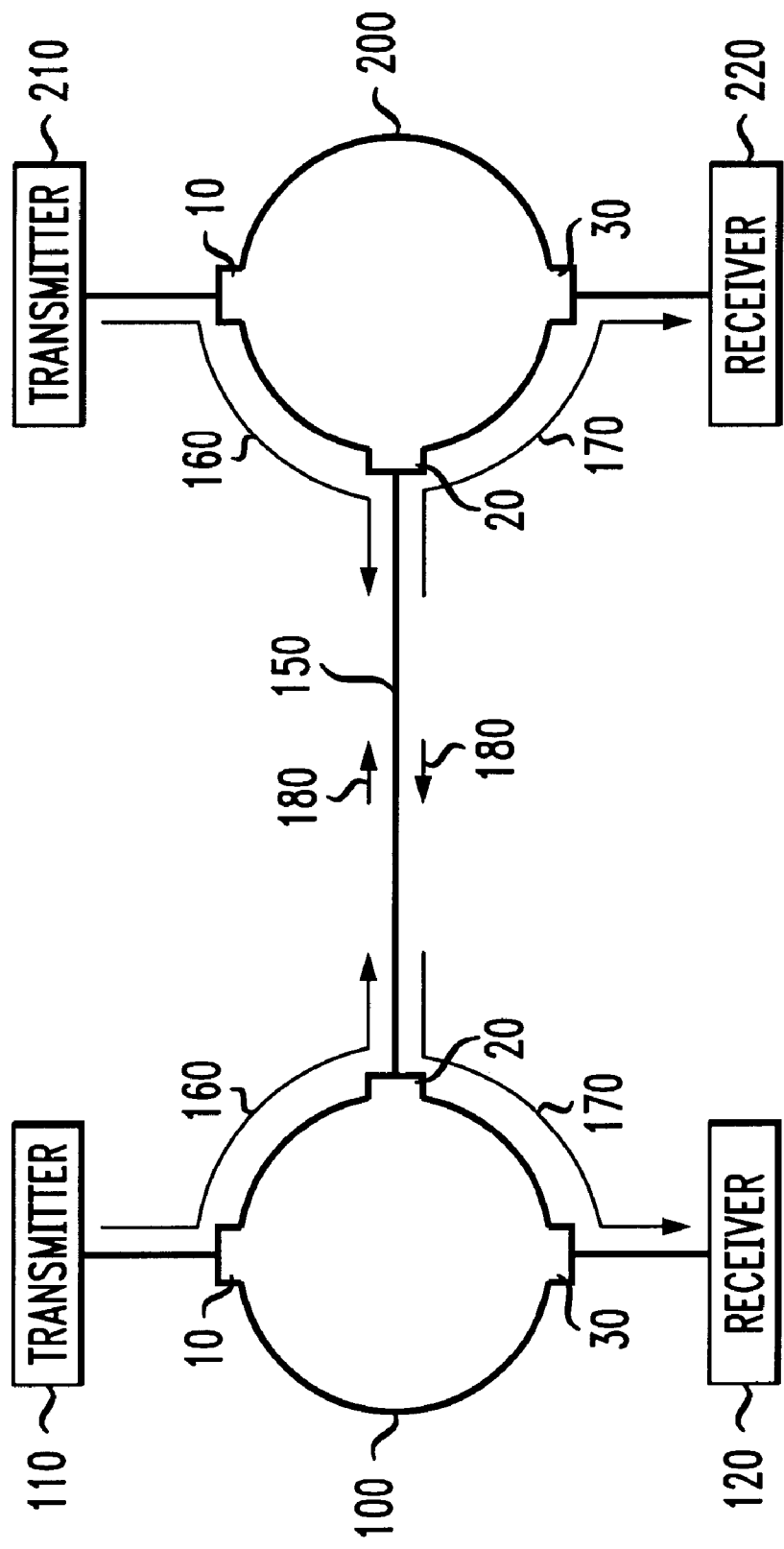
FIG. 1 is a block diagram of a bidirectional communication system employing an optical circulator at each end of a single fiber optic link.

The preferred embodiment of the present invention and its advantages are best understood by referring to the drawings, like numerals being used for like and corresponding parts of the various drawings.

FIG. 2 depicts a diagrammatic view of the beam splitting cube 300 which provides optical isolation and optical reflection of light beams relative to the polarization of such light beams.

A first optic light source 310 preferably having a polarized counterclockwise rotation of forty five degrees relative to the horizontal axis 500 of the first light source enters the cube 300 passing through a first face of the cube 320 directed towards the cube interface 330 wherein the interface is coated with an optical coating 340. In a preferred embodiment, the cube is coated with an anti-reflective coating (not shown), the interface coating is a broadband coating for the range of 1300–1600 nm, and the first optic light source is a polarized laser source.

Approximately 99% of the first optic light source is transmitted at the interface and is directed to a second face of the cube 350, wherein the transmitted portion 360 of the first light source is emitted from the second face 350. The remaining 1% non-transmitted portion of the first optic light source is isolated from the laser source due to the presence of the Faraday rotator which prevents the light from traveling in the source light's direction.

A second optic light source 400 preferably having a polarized clockwise rotation of forty five degrees relative to the horizontal axis 500 of the first light source enters the cube 300 passing through a second face of the cube 350 directed towards the cube interface 330 wherein approximately 99% of the second optic light source is transmitted by reflection to a third face of the cube 370 and the transmitted portion 410 of the second light source is emitted from the third face 370.

Use of polarizing beam splitter cube virtually eliminates the light intensity losses of traditional beam splitting plates, resulting in 50–87% more light in the final image. Another benefit of using polarizing beam splitting cube is the virtual elimination of ghost images from reflected light.

Figure 3:
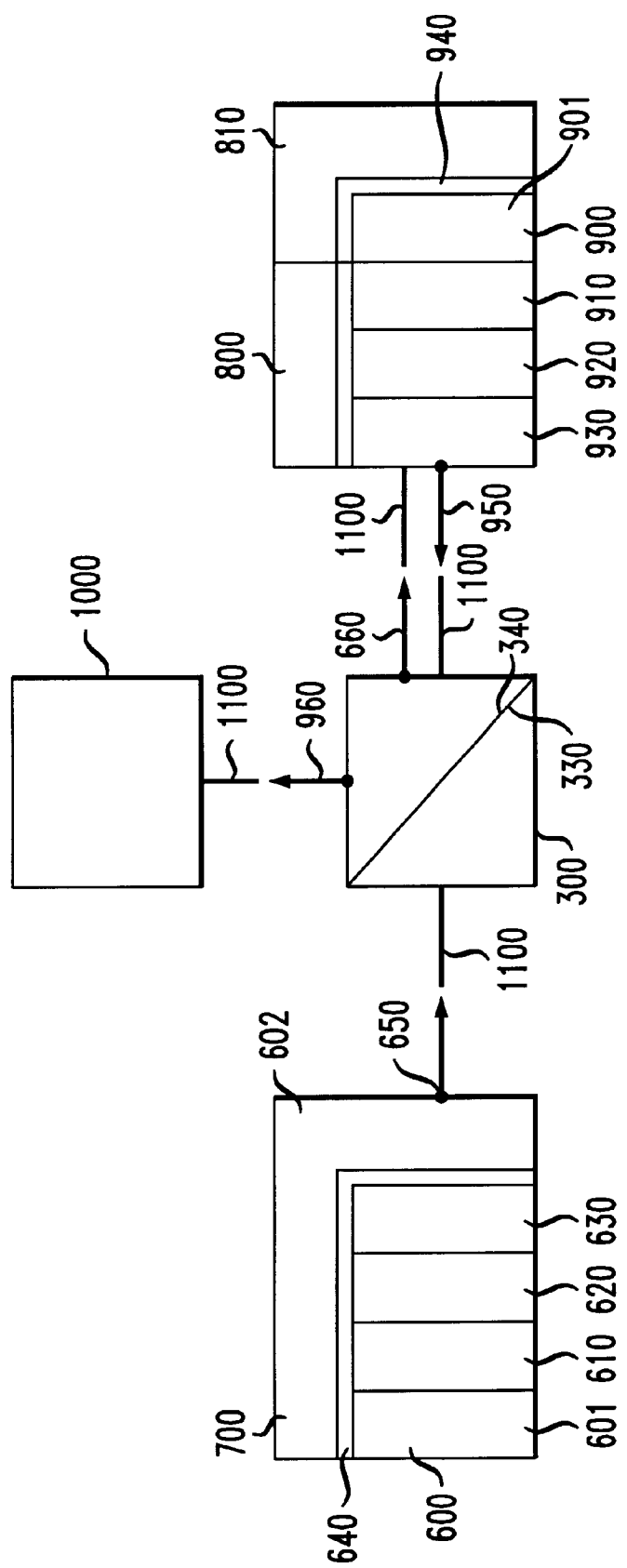
FIG. 3 is a diagrammatic view of the optical isolator and circulator according to the present invention, showing the paths of light rays and directional flow of optical beams throughout the system.

FIG. 3 depicts a diagrammatic view of the optical isolator and circulator in a preferred embodiment of the present invention.

A first light source 600, which is preferably a polarized laser source, is transmitted through a polarizer 610, a Faraday rotator 620, and optionally an analyzer 630, wherein the combination 640 of the polarizer, Faraday rotator and optional analyzer are aligned relative to one another such that in a preferred embodiment, the combination is a Faraday isolator 640, and is emitted as a first rotated light source 650. In a preferred embodiment the Faraday isolator 640 is part of a first transceiver device 700 which is capable of transmitting and receiving polarized light beams and comprises a first transmitter 601 and first receiver 602.

The first rotated light source 650, preferably rotated counterclockwise forty five degrees, is directed to the beam splitting cube 300 and passes through an interface 330 having a broadband optical coating 340 wherein a first emitted beam 660, having approximately 99% of the first rotated light source intensity, is directed to a second receiving means 800, which in a preferred embodiment the receiving means is part of a second transceiver 810 which is capable of transmitting and receiving polarized light beams, and further comprises a second transmitter 901.

A second light source 900, which is preferably a polarized laser source, is transmitted through a polarizer 910, a Faraday rotator 920 and optionally an analyzer 930 wherein the combination of the polarizer, the Faraday rotator and the optional analyzer are aligned relative to one another and a first light source 600 such that in a preferred embodiment, the combination is a Faraday isolator 940, and is emitted as a second rotated light source 950 wherein the second clockwise rotated light source is preferably at a polarization of forty five degrees.

The second rotated light sources 950 is directed to the beam splitter cube 300 and is reflected from the interface 330, wherein a reflected beam 960 having approximately 99% of the second rotated light source intensity is directed towards a third receiving means 1000 which is positioned perpendicular to the first transmitted beam 650 and parallel to the cube 300.

In a preferred embodiment, the first light source and the second light source transmit respective light sources simultaneously.

In another preferred embodiment, a fiber means 1100 connects the first transceiver 700, the second transceiver 810, the beam splitting cube 300, and the third receiving means 1000.

Figure 4A:
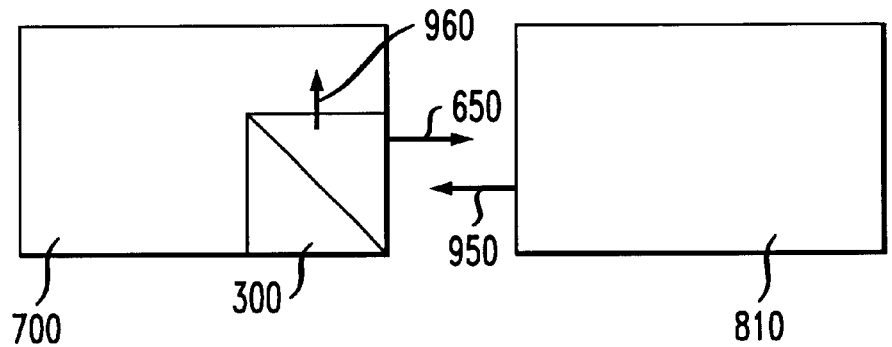
FIG. 4 depicts diagrammatic views of a preferred embodiment of the invention having transceivers integrated with the beam splitting cube.

FIG. 4 depicts a preferred embodiment of the present invention having a beam splitting cube integrated with transceiver devices. FIG. 4a shows the beam splitting cube 300 integrated with a first transceiver device 700. A first rotated light 650 passes through the cube and is directed to a second transceiver device 810. The second transceiver device 810 transmits a second rotated light source 950 to the integrated cube 300 and a reflected beam 960 results which is received by the first transceiver 700. Optionally, the beam splitting cube may be integrated with the second transceiver so the second transceiver receives both the first rotated light 650 and the reflected beam 960.

Figure 4B:
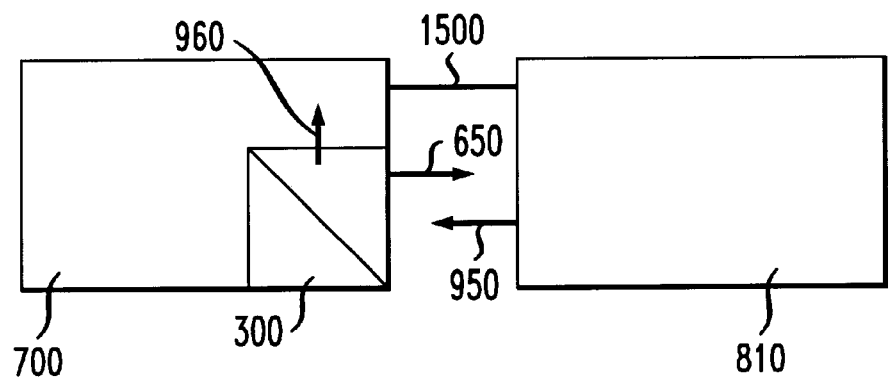

FIG. 4b shows an optional fiber connection 1500 in conjunction with an integrated cube. The fiber connection 1500 provides a communications path between each of the transceivers excluding the cube.

Figure 4C:
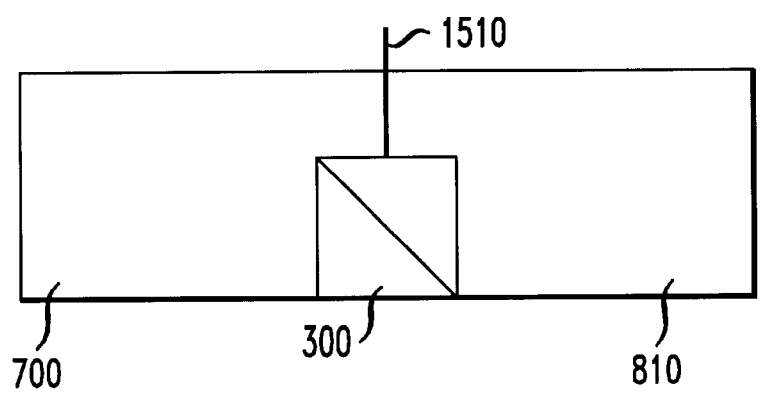

FIG. 4c shows a cube 300 integrated with both a first and second transceivers 700, 810, and an optional fiber path 1510 for a resulting reflected beam.

Figure 5:
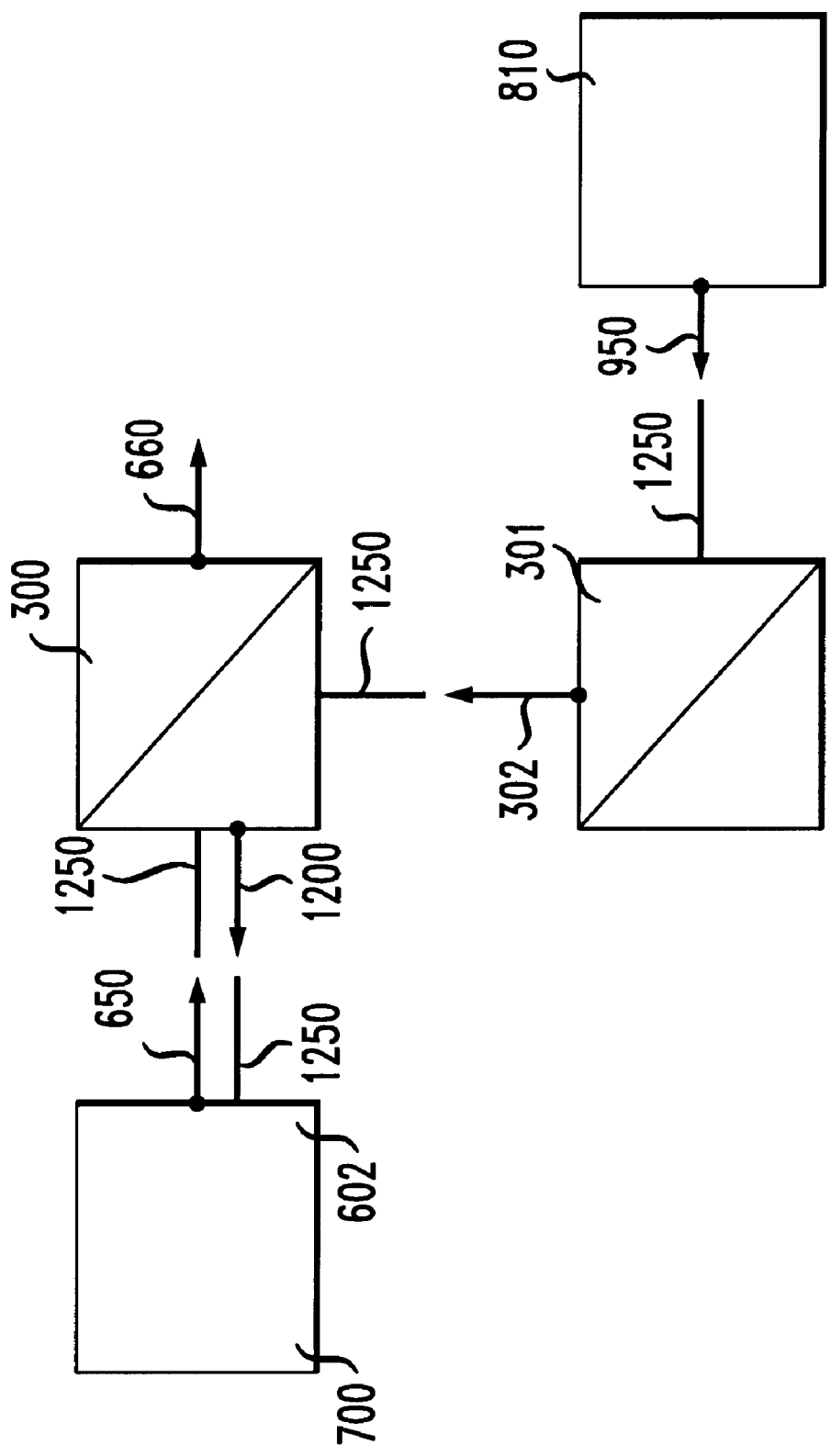
FIG. 5 is a diagrammatic view of the optical isolator and circulator according to the present invention comprising a plurality of beam splitting cubes.

FIG. 5 depicts a further preferred embodiment of the present invention wherein a plurality of beam splitting cubes 300, 301 and arranged to permit bidirectional communications. In FIG. 5 a first transmitted light source 650 to pass through a first beam splitting cube 300 and a first emitted beam 660 is directed away from the cube 300.

A second transmitted light source 950 is emitted from a second transceiver device 810 and is thereafter directed to a second beam splitting cube 301 wherein a first reflected beam 302 is emitted and is thereafter directed to a first beam splitting cube 300 such that the resulting emitted beam 1200 is reflected from the first beam splitting cube 300 and is thereafter directed to a receiving means 602 of the first transceiver device 700. FIG. 5 depicts two beam splitting cubes by way of example and not of limitation such that a plurality of cubes may further be arranged for bidirectional communication.

In a further preferred embodiment, a fiber means 1250 connects the first transceiver 700, the second transceiver 810, and the first 300 and second 301 beam splitting cubes.

Figure 6A:
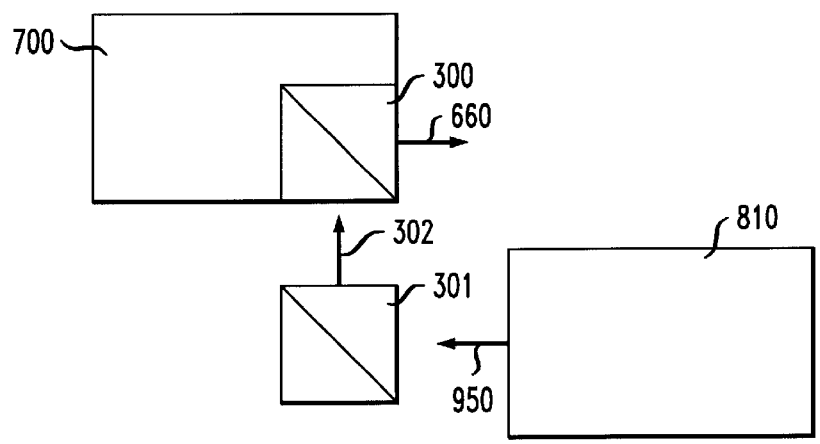
FIG. 6 depicts diagrammatic views of a preferred embodiment of the invention having a plurality of beam splitting cubes integrated with transceivers.
Figure 6B:
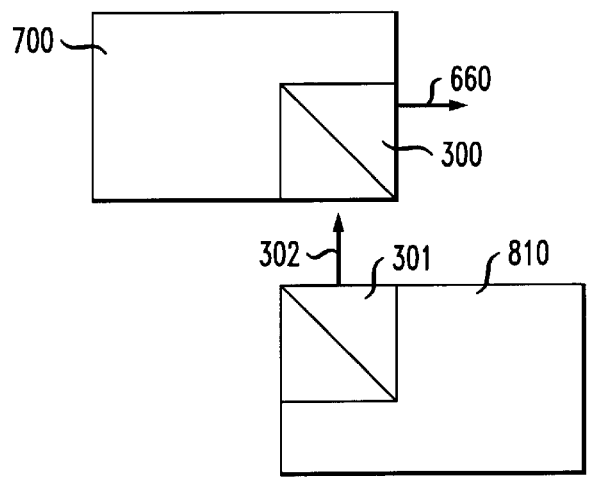
Figure 6C:
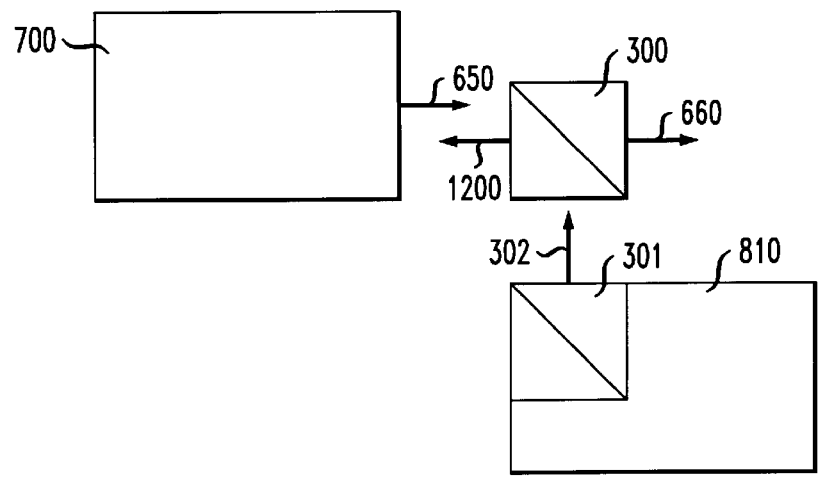

FIG. 6 depicts the cubes 300, 301 integrally arranged with transceivers 700, 810, and having optical light paths traveling in a similar manner as previously discussed for FIG. 5.

What is claimed is:

1. An optical isolator and circulator device comprising:
    a first light source,
    a second light source, and
    at least two polarizing beam splitting cubes,
        wherein the first light source generates a first beam of light having a first polarized rotation from a first transmitter, wherein the first transmitter comprises a first polarizer, and a first Faraday rotator which are adaptably aligned to rotate the first beam of light from the first light source to the first polarized rotation and emit the first beam of light having the first polarized rotation from the first transmitter,
        wherein the second light source generates a second beam of light having a second polarized rotation from a second transmitter, wherein the second transmitter comprises a second polarizer and a second Faraday rotator which are adaptably aligned to rotate the second beam of light from the second light source to the second polarized rotation, which differs from the first polarized rotation by ninety degrees, and emit the second beam of light having the second polarized rotation from the second transmitter,
        wherein the at least two polarizing beam splitting cubes comprise a plurality of faces, having an anti-reflective coating, and a diagonal interface, having a broadband optical coating in the 1300 to 1600 nm range, adaptably aligned relative to the first light source and the second light source to:
            emit a first beam of light from the first light source to a first face on a first of the at least two polarizing beam splitting cubes,
            emit a second beam of light from the second light source to a third face on a second of the at least two polarizing beam splitting cubes,
            pass the first beam of light, having a first polarization, through an interface and emit a first generation beam from a second face of the first cube, pass the second beam of light, having a second polarization differing from the first polarization by ninety degrees to the interface of the second cube and reflect the second beam of light as a reflected beam from a fourth face of the second cube directed to a fifth face of the first cube, wherein the reflected beam is further reflected from the interface of the first cube and is directed to the first light source,
        wherein the first and second beam of light are emitted to the respective cubes simultaneously, for bidirectional communications.

2. The device of claim 1, wherein the at least one cube comprises a first and second prism forming the interface therebetween wherein the interface simultaneously transmits linearly polarized light beams directed to the interface, from the first beam of light and the second beam of light, in directions responsive to a polarization orientation of the first beam of light and the second beam of light, respectively,
    wherein the second light source generates a second beam of light having a second polarized rotation from a second transmitter, wherein the second transmitter comprises a second polarizer and a second Faraday rotator which are adaptably aligned to rotate the second beam of light from the second light source to the second polarized rotation, which differs from the first polarized rotation by ninety degrees, and emit the second beam of light having the second polarized rotation from the second transmitter.

3. The device of claim 2, wherein the at least one cube is a dichroic mirror.

4. The device of claim 1, wherein a fiber connects the first light source, the second light source and the at least one beam splitting cube.

5. The device of claim 4, wherein the fiber is a polarizing maintaining fiber.

6. The device of claim 1, where in the first light source is a laser at 1310 nm.

7. The device of claim 1, wherein the second light source is a laser at 1550 nm.

8. The device of claim 1, wherein the first light source is a laser at 1310 nm and the second light source is a laser at 1550 nm.

9. The device of claim 1, wherein the first polarized rotation of the first beam of light is counterclockwise forty five degrees relative to a horizontal axis of the first beam of light.

10. The device of claim 1, wherein the second polarized rotation of the second beam of light is clockwise forty five degrees relative to a horizontal axis of the first beam of light.

11. The device of claim 1, wherein the first light source further comprises a first analyzer positioned between the first Faraday rotator and the cube.

12. The device of claim 11, wherein the first analyzer is rotated counterclockwise by forty five degrees relative to the horizontal axis of the first light source.

13. The device of claim 1, wherein the second light source further comprises a second analyzer positioned between the second Faraday rotator and the cube.

14. The device of claim 13, wherein the second analyzer is rotated clockwise by forty five degrees relative to the horizontal axis of the first light source.

15. The device of claim 1, wherein the first light source is a transceiver device.

16. The device of claim 15, wherein the transceiver device comprises a high speed transmitting means and a high speed receiving means.

17. The device of claim 1, wherein the second light source is a transceiver device.

18. The device of claim 17, wherein the transceiver device comprises a high speed transmitting means and a high speed receiving means.

19. The device of claim 1, wherein the optical isolator and circulator device further comprises a receiving means for the reflected second beam of light.

20. The device of claim 19, wherein the receiving means is positioned perpendicular to the horizontal axis of the first light source.

21. The device of claim 19, wherein the receiving means is a receiver.

22. The device of claim 1, wherein the first and second light sources are transceiver devices, for bidirectional communications.

23. An optical isolator and circulator device comprising:
a first light source,
a second light source, and
at least two polarizing beam splitting cubes,
wherein the first light source generates a first beam of light having a first polarized rotation from a first transmitter, wherein the first transmitter comprises a first polarizer, and a first Faraday rotator which are adaptably aligned to rotate the first beam of light from the first light source to the first polarized rotation and emit the first beam of light having the first polarized rotation from the first transmitter,
wherein the second light source generates a second beam of light having a second polarized rotation from a second transmitter, wherein the second transmitter comprises a second polarizer and a second Faraday rotator which are adaptably aligned to rotate the second beam of light from the second light source to the second polarized rotation, which differs from the first polarized rotation by ninety degrees, and emit the second beam of light having the second polarized rotation from the second transmitter,
wherein the at least two polarizing beam splitting cubes comprise a plurality of faces, having an anti-reflective coating, and a diagonal interface, having a broadband optical coating in the 1300 to 1600 nm range, adaptably aligned relative to the first light source and the second light source to:
emit a first beam of light from the first light source to a first face on a first of the at least two polarizing beam splitting cubes,
emit a second beam of light from the second light source to a third face on a second of the at least two polarizing beam splitting cubes,
pass the first beam of light, having a first polarization, through an interface and emit a first generation beam from a second face of the first cube, pass the second beam of light, having a second polarization differing from the first polarization by ninety degrees to the interface of the second cube and reflect the second beam of light as a reflected beam from a fourth face of the second cube directed to a fifth face of the first cube, wherein the reflected beam is further reflected from the interface of the first cube and is directed to the first light source,
wherein the first and second beam of light are emitted to the respective cubes simultaneously, for bidirectional communications; and
an optical light receiving means positioned to receive the reflected second beam of light, transmitted from the third face of the second polarizing beam splitting cube, wherein the receiving means is positioned perpendicular to the horizontal axis of the first light source.

24. An optical isolator and circulator device comprising:
a first light source,
a second light source, and
at least two polarizing beam splitting cubes,
wherein the first light source generates a first beam of light having a first polarized rotation from a first transmitter, wherein the first transmitter comprises a first polarizer, and a first Faraday rotator which are adaptably aligned to rotate the first beam of light from the first light source to the first polarized rotation and emit the first beam of light having the first polarized rotation from the first transmitter,
wherein the second light source generates a second beam of light having a second polarized rotation from a second transmitter, wherein the second transmitter comprises a second polarizer and a second Faraday rotator which are adaptably aligned to rotate the second beam of light from the second light source to the second polarized rotation, which differs from the first polarized rotation by ninety degrees, and emit the second beam of light having the second polarized rotation from the second transmitter,
wherein the at least two polarizing beam splitting cubes comprise a plurality of faces, having an anti-reflective coating, and a diagonal interface, having a broadband optical coating in the 1300 to 1600 nm range, adaptably aligned relative to the first light source and the second light source to:
emit a first beam of light from the first light source to a first face on a first of the at least two polarizing beam splitting cubes, emit a second beam of light from the second light source to a third face on a second of the at least two polarizing beam splitting cubes, pass the first beam of light, having a first polarization, through an interface and emit a first generation beam from a second face of the first cube, pass the second beam of light, having a second polarization differing from the first polarization by ninety degrees to the interface of the second cube and reflect the second beam of light as a reflected beam from a fourth face of the second cube directed to a fifth face of the first cube, wherein the reflected beam is further reflected from the interface of the first cube and is directed to the first light source, wherein the first and second beam of light are emitted to the respective cubes simultaneously, for bidirectional communications;

an optical light receiving means positioned to receive the reflected second beam of light, transmitted from the third face of the second polarizing beam splitting cube, wherein the receiving means is positioned perpendicular to the horizontal axis of the first light source; and wherein the first light source further comprises a first analyzer angled counter-clockwise at forty-five degrees relative to a horizontal axis of the first light source; and wherein the second light source further comprises a second analyzer angled counter-clockwise at forty-five degrees relative to a horizontal axis of the first light source.

25. An optical isolator and circulator device comprising:

a first light source, a second light source, and at least two polarizing beam splitting cubes, wherein the first light source generates a first beam of light having a first polarized rotation from a first transmitter, wherein the first transmitter comprises a first polarizer, and a first Faraday rotator which are adaptably aligned to rotate the first beam of light from the first light source to the first polarized rotation and emit the first beam of light having the first polarized rotation from the first transmitter, wherein the second light source generates a second beam of light having a second polarized rotation from a second transmitter, wherein the second transmitter comprises a second polarizer and a second Faraday rotator which are adaptably aligned to rotate the second beam of light from the second light source to the second polarized rotation, which differs from the first polarized rotation by ninety degrees, and emit the second beam of light having the second polarized rotation from the second transmitter, wherein the at least two polarizing beam splitting cubes comprise a plurality of faces, having an anti-reflective coating, and a diagonal interface, having a broadband optical coating in the 1300 to 1600 nm range, adaptably aligned relative to the first light source and the second light source to:

emit a first beam of light from the first light source to a first face on a first of the at least two polarizing beam splitting cubes, emit a second beam of light from the second light source to a third face on a second of the at least two polarizing beam splitting cubes, pass the first beam of light, having a first polarization, through an interface and emit a first generation beam from a second face of the first cube, pass the second beam of light, having a second polarization differing from the first polarization by ninety degrees to the interface of the second cube and reflect the second beam of light as a reflected beam from a fourth face of the second cube directed to a fifth face of the first cube, wherein the reflected beam is further reflected from the interface of the first cube and is directed to the first light source, wherein the first and second beam of light are emitted to the respective cubes simultaneously, for bidirectional communications;

an optical light receiving means positioned to receive the reflected second beam of light, transmitted from the third face of the second polarizing beam splitting cube, wherein the receiving means is positioned perpendicular to the horizontal axis of the first light source;

wherein the first light source further comprises a first analyzer angled counter-clockwise at forty-five degrees relative to a horizontal axis of the first light source;

wherein the second light source further comprises a second analyzer angled counter-clockwise at forty-five degrees relative to a horizontal axis of the first light source; and wherein a fiber connects the first light source to one of the at least two beam splitting cubes and the second light source to one of the at least two beam splitting cubes and the receiving means to one of the at least two beam splitting cubes.

26. The device of claim 25, wherein the fiber is a polarization maintaining fiber.

27. A method for providing bidirectional communication traversing a single fiber optic link, comprising the steps of:

emitting a first beam of light from a first light source, wherein the first light source comprises a first polarizer and a first Faraday rotator, to a first face on a first polarizing beam splitting cube;

emitting a second beam of light from the second light source, wherein the second light source comprises a second polarizer and a second Faraday rotator, to a third face on a second polarizing beam splitting cube;

passing the first beam of light, having a first polarization, through an interface and emitting a first generation beam from a second face of the first cube, passing the second beam of light, having a second polarization differing from the first polarization by ninety degrees to the interface of the second cube and reflecting the second beam of light as a reflected beam from a fourth face of the second cube directed to a fifth face of the first cube, wherein the reflected beam is further reflected from the interface of the first cube and is directed to the first light source; and wherein the first and second beam of light are emitted to their respective cubes simultaneously.

28. The method of claim 27 wherein the first and second cubes are adaptably integrated with the first and second light source, respectively.

* * * * *